US008117636B2

(12) United States Patent
Cho

(10) Patent No.: US 8,117,636 B2
(45) Date of Patent: Feb. 14, 2012

(54) METHOD OF DISPLAYING DIGITAL BROADCASTING TELEVISION PROGRAMS AND RELATED DATA BROADCASTING PROGRAMS ON THE SAME SCREEN WITH OPTIONS TO SELECT RESERVED VIEWING AND RESERVED RECORDING THEREON

(75) Inventor: Young Hoon Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/637,473

(22) Filed: Dec. 14, 2009

(65) Prior Publication Data

US 2010/0162310 A1 Jun. 24, 2010

Related U.S. Application Data

(63) Continuation of application No. 10/301,716, filed on Nov. 22, 2002.

(30) Foreign Application Priority Data

Nov. 23, 2001 (KR) .................................. 2001-73340

(51) Int. Cl.
*G06F 3/00* (2006.01)
*H04N 5/455* (2011.01)
*H04J 3/02* (2006.01)
(52) U.S. Cl. .............................. 725/40; 725/61; 370/537
(58) Field of Classification Search .................... 725/40, 725/61; 370/537
See application file for complete search history.

(56) References Cited

U.S. PATENT DOCUMENTS 6,166,778 A * 12/2000 Yamamoto et al. ........... 348/569
6,525,775 B1 2/2003 Kahn et al.

| 2002/0054068 | A1 | 5/2002 | Ellis et al. |
| 2004/0139465 | A1 | 7/2004 | Matthews et al. |
| 2005/0193425 | A1 | 9/2005 | Sull et al. |

FOREIGN PATENT DOCUMENTS

KR 1020010063875 A 7/2001

OTHER PUBLICATIONS

Michael Isnardi, ATSC Program and System Information Protocol (PSIP), Oct. 18, 2000, WBA/SBE Broadcasters Clinic 2000, Sarnoff Corporation.
Arthur W. Alison, PSIP 101: What You Need to Know, Jun. 2001, broadcastengineering.com.
DigiPoints, Electronic Program Guides, Sep. 29, 1999, vol. III, Issue 6, Society of cable Telecommunications Engineers.
Advanced Television Systems Committee, ATSC Recommended Practice: Implementation Guidelines for the ATSC Data Broadcast Standard (Doc. A/90), Jun. 10, 2001.

* cited by examiner

*Primary Examiner* — Hoang-Vu A Nguyen-Ba
(74) *Attorney, Agent, or Firm* — Birch, Stewart, Kolasch & Birch, LLP

(57) ABSTRACT

According to an embodiment, there is a method of displaying digital broadcasting using a digital device, the method comprising: storing, in the digital device, a plurality of television program listings, each of the television program listing including a title, telecast time information and channel information; displaying the plurality of television program listings on a screen of the digital device; and if a program from the displayed television program listings is selected, displaying detailed information of the selected program on the screen, wherein the selected program has a plurality of data broadcasting programs related to the selected program, and wherein the detailed information includes information of the selected program and/or information of at least one of the data broadcasting programs related to the selected program.

8 Claims, 5 Drawing Sheets

METHOD OF DISPLAYING DIGITAL BROADCASTING TELEVISION PROGRAMS AND RELATED DATA BROADCASTING PROGRAMS ON THE SAME SCREEN WITH OPTIONS TO SELECT RESERVED VIEWING AND RESERVED RECORDING THEREON

This application is a Continuation of co-pending application Ser. No. 10/301,716, filed Nov. 22, 2002, which claims priority folder 35 U.S.C. §119 on Korean Application No. 73340/2001 filed on Nov. 23, 2002. The entire contents of these applications are hereby incorporated by reference in their entirety.

BACKGROUND OF THE INVENTION

1. Field of the Invention

The present invention relates to a digital broadcasting system, and more particularly, to a digital broadcasting transmission system capable of providing detailed information on data broadcasting programs to a user via an electronic program guide (EPG).

2. Description of the Related Art

Generally, digital television is a general term of televisions which transmit broadcasting in a digital mode. The United States determines to employ digital mode to the next-generation television called advanced television (ATV). In many countries, digital televisions have been actively developed in next-generation television modes interfaced with broadband integrated services digital networks (B-ISDNs) or computer networks. In Europe, many projects, such as HD DIVINE in the Kingdom of Sweden, SPECTRE in the United Kingdom, DIAMOND in the French Republic, etc., have been progressed.

FIG. 1 is a schematic block diagram of a conventional digital broadcasting transmission system.

Referring to FIG. 1, the conventional digital broadcasting transmission system 100 includes: a plurality of single program encoding units 110 for encoding and multiplexing respective single programs constituted with video/audio/data signals; a PSIP (program and system information protocol) generating unit 120 for generating a PSIP which provides detailed information on the video/audio broadcasting programs to be multiplexed in the single program encoding units 110; a multiple program multiplexing unit 130 for multiplexing signals transmitted from the plurality of single program encoding units 110 and the PSIP generating unit 120; and a transmission unit 140 for transmitting signals multiplexed in the multiple program multiplexing unit 130.

Here, the single program encoding unit 110 includes a video signal encoder 111 (e.g., MPEG-2 encoder) for encoding video signals, an audio signal encoder 112 (e.g., AC-3 encoder) for encoding audio signals, and a single program multiplexer 113 for multiplexing the encoded video signals, the encoded audio signals, and the data signals of the audio/video broadcasting.

At this time, the information on the video/audio broadcasting can be displayed on a screen of the digital television in an electronic program guide (EPG) mode using the PSIP generated from the PSIP generating unit 120. Digital broadcasting program information edited by the EPG and displayed can provide the detailed information on the video/audio broadcasting programs to the user. However, in case of the data broadcasting program, only information on whether to be the data broadcasting is provided. At this time, the detailed information on the video/audio broadcast programs includes a broadcast channel number, a current time, a name of broadcasting station, a broadcasting start time/end time, a title of program, a grade of program, a stereo/mono classification, whether to provide a caption service, whether to provide a sound multiplexing service, a conditional access information, a program progression status, an additional text message, etc.

However, one or more data broadcasting programs can exist in one general video/audio broadcasting program, and respective data broadcastings are executed without regular rules within the general video/audio broadcasting program.

Accordingly, in an environment of the digital broadcasting via the conventional digital broadcasting transmission system, before the broadcasting programs including the data broadcasting program start, digital television viewers do not know detailed information on the data broadcasting, for example, how many data broadcasting programs are contained in the broadcasting program, when the respective data broadcasting programs start in an entire broadcasting program time, and how long the respective data broadcasting programs will be broadcast.

In addition, as the data broadcasting programs are playing an important role in transmission of game/education/information of all sorts, there are increasing demands to make good use of the contents of the data broadcasting programs.

SUMMARY OF THE INVENTION

Accordingly, the present invention is directed to a digital broadcasting transmission system that substantially obviates one or more problems due to limitations and disadvantages of the related art.

An object of the present invention is to provide a digital broadcasting transmission system capable of providing detailed information on the data broadcasting programs as well as video/audio broadcasting programs to users via an electronic program guide (EPG).

Another object of the present invention is to provide a digital broadcasting transmission protocol capable of providing PSIP (program and system information protocol) including detailed information on video/audio/data broadcasting programs.

Further another object of the present invention is to provide a digital television capable of providing detailed information on video/audio/data broadcasting programs to users via an EPG, and providing various convenient functions to users via an EPG displayed on a screen.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a digital broadcasting transmission system, which comprises: a plurality of single program encoding means for encoding and multiplexing respective single programs including video/audio/data signals; a PSIP generating means for generating PSIP (program and system information protocol), the PSIP providing detailed information on video/audio/data broadcasting programs to be multiplexed in the single program encoding means; a multiple program multiplexing means for multiplexing digital broadcasting stream transmitted from the plurality of signal program encoding means and the PSIP transmitted from the PSIP generating means; and a transmission means for transmitting digital broadcasting signals multiplexed in the multiple program multiplexing means.

Here, the PSIP of the data broadcasting programs, which is generated from the PSIP generating means, includes at least one selected from the group consisting of the number of the data broadcasting programs contained in one video/audio broadcasting program, titles of the respective data broadcasting programs, each start time/end time of the respective data broadcasting programs, stably receivable time of the respective data broadcasting programs, grades of the respective data broadcasting programs, conditional access information of the respective data broadcasting programs, and content summary of the data broadcasting programs.

In another aspect of the present invention, there is provided a digital broadcasting transmission protocol in a transmission of digital broadcasting signals constituted with video/audio/data signals, which comprises PSIP (program and system information protocol) for providing detailed information on video/audio broadcasting programs and detailed information on data broadcasting programs.

Here, the PSIP for providing the detailed information on the data broadcasting programs includes at least one selected from the group consisting of the number of the data broadcasting programs contained in one video/audio broadcasting program, titles of respective data broadcasting programs, each start time/end time of the respective data broadcasting programs, stably receivable time of the respective data broadcasting programs, grades of the respective data broadcasting programs, conditional access information of the respective data broadcasting programs, and content summary of the data broadcasting programs.

In further another aspect of the present invention, there is provided a digital television, which analyzes the PSIP transmitted from the digital broadcasting transmission system or the digital broadcasting transmission protocol and displays an electronic program guide (EPG) of the data broadcasting programs on the screen.

Here, the digital television provides at least one selected from the group consisting of a reserved watching of the data broadcasting programs, a reserved recording thereof, and a selectively reserved recording thereof to a user using the information on the data broadcasting programs provided via the EPG.

According to the present invention, before the broadcasting starts, a user can obtain the detailed information on the video/audio/data broadcasting programs by providing the detailed information to a user via the EPG. Additionally, it is possible to conveniently select the reserved watching, the reserved recording, and the selectively reserved recording via the EPG.

According to another aspect, the invention provides a method of displaying digital broadcasting using a digital device, the method comprising: storing, in the digital device, a plurality of television program listings, each of the television program listing including a title, telecast time information and channel information; displaying the plurality of television program listings on a screen of the digital device; and if a program from the displayed television program listings is selected, displaying detailed information of the selected program on the screen, wherein the selected program has a plurality of data broadcasting programs related to the selected program, and wherein the detailed information includes information of the selected program and/or information of at least one of the data broadcasting programs related to the selected program.

According to another aspect, the invention provides a method of displaying digital broadcasting using a digital device, the method comprising: receiving, by the digital device, a plurality of television program listings, each of the television program listing including a title, telecast time information and channel information; displaying a program guide including the plurality of television program listings on a screen of the digital device; and providing, on the screen, a menu option for allowing a user to perform a selectively reserved recording of at least one program identified in the displayed program guide, wherein the selectively recording of at least one program includes selecting one of the following: an individual recording of a video/audio broadcasting program identified in the displayed program guide; an individual recording of a data broadcasting program related to a video/audio broadcasting program identified in the displayed program guide; a simultaneous recording of both a video/audio broadcasting program identified in the displayed program guide and a data broadcasting program related to said video/audio broadcasting program; or a recording of a desired data broadcasting program.

According to another aspect, the invention provides a device for processing PSIP (Program and System Information Protocol) data, comprising: a receiving unit; a display unit; and a controller, cooperating with the receiving unit, to receive and process PSIP of video/audio broadcasting programs, and PSIP of data broadcasting programs associated with the video/audio broadcasting programs, wherein the PSIP of the data broadcasting programs includes at least one of the following items:

(a) the number of data broadcasting programs contained in one broadcasting program, (b) start time/end time of respective data broadcasting programs, (c) stably received time of respective data broadcasting programs, (d) grades of respective data broadcasting programs, (e) conditional access information of respective data broadcasting programs, and (f) content summary of additional data broadcasting programs, and wherein the controller is further configured to control the display unit to display the video/audio broadcasting programs and the data broadcasting programs.

According to another aspect, the invention provides a digital device for displaying digital broadcasting, the digital device comprising: a storage unit configured to store a plurality of television program listings, each of the television program listing including a title, telecast time information and channel information; a display unit including a screen; and a controller, cooperating with the storage unit and the display unit, to: display the plurality of television program listings on the screen of the display unit, and if a program from the displayed television program listings is selected, display detailed information of the selected program on the screen, wherein the selected program has a plurality of data broadcasting programs related to the selected program, and wherein the detailed information includes information of the selected program and/or information of at least one of the data broadcasting programs related to the selected program.

According to another aspect, the invention provides a digital device for displaying digital broadcasting, the digital device comprising: a receiving unit configured to receive a plurality of television program listings, each of the television program listing including a title, telecast time information and channel information; a display unit including a screen; and a controller, cooperating with the display unit, to: display a program guide including the plurality of television program listings on the screen of the display unit; and provide, on the screen, a menu option for allowing a user to perform a selectively reserved recording of at least one program identified in the displayed program guide, wherein the selectively recording of at least one program includes selecting one of the following: an individual recording of a video/audio broadcasting program identified in the displayed program guide, an individual recording of a data broadcasting program related to a video/audio broadcasting program identified in the displayed program guide, a simultaneous recording of both a video/audio broadcasting program identified in the displayed program guide and a data broadcasting program related to said video/audio broadcasting program, or a recording of a desired data broadcasting program.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
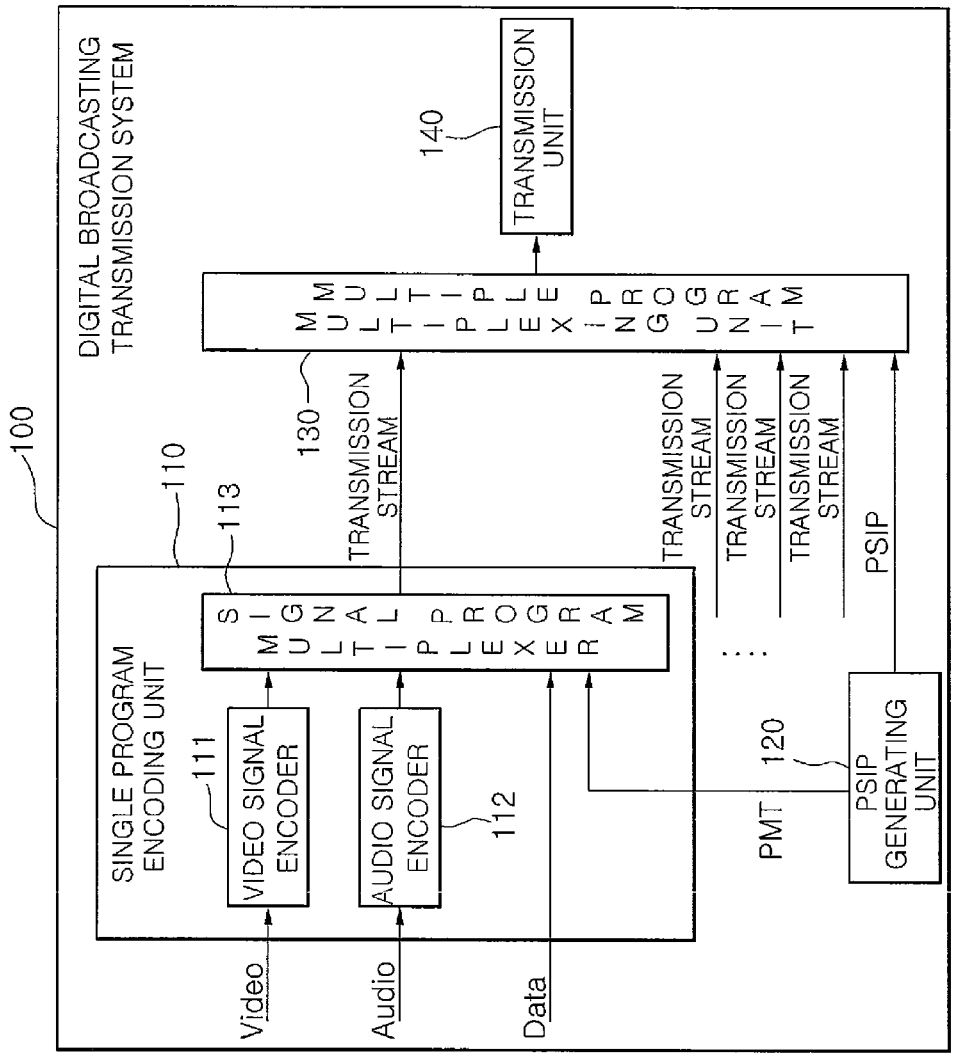
FIG. 1 is a schematic block diagram showing a structure of a conventional digital broadcasting transmission system.
Figure 2:
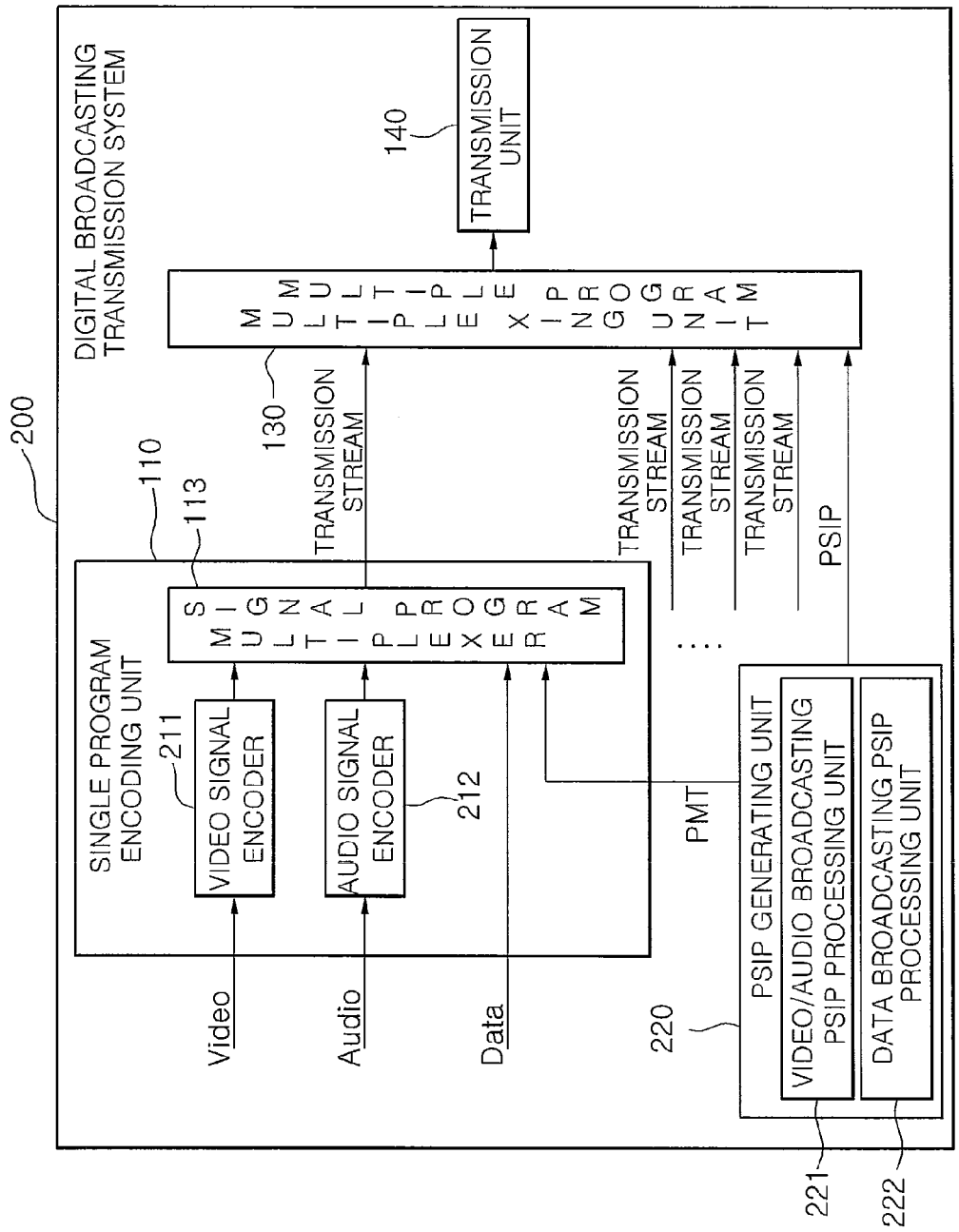
FIG. 2 is a schematic block diagram showing a structure of a digital, broadcasting transmission system in accordance with the present invention.

FIG. 2 is a schematic block diagram showing a structure of a digital broadcasting transmission system in accordance with the present invention.

Referring to FIG. 2, the digital broadcasting transmission system 200 of the present invention includes: a plurality of single program encoding units 210 for encoding and multiplexing respective single programs consisting of video/audio/data signals; a PSIP generating unit 220 for generating a PSIP which provides detailed information on the video/audio/data broadcasting programs to be multiplexed in the single program encoding units 210; a multiple program multiplexing unit 230 for multiplexing digital broadcasting transmission streams transmitted from the single program encoding units 210 and the PSIP transmitted from the PSIP generating unit 220; and a transmission unit 440 for transmitting digital broadcasting signals multiplexed in the multiple program multiplexing unit 230.

Here, the single program encoding unit 210 includes a video signal encoder 211 (e.g., MPEG-2 encoder) for encoding video signals, an audio signal encoder 212 (e.g., AC-3 encoder) for encoding audio signals, and a single program multiplexer 213 for multiplexing the encoded video signals, the encoded audio signals, and the data signals of the audio/video broadcastings.

The PSIP generating unit 220 includes a video/audio broadcasting PSIP processing unit 221 for processing the PSIP of the video/audio broadcasting programs, and a data broadcasting PSIP processing unit 222 for processing the PSIP of the data broadcasting programs.

Hereinafter, there will be described the PSIP including information on the video/audio/data broadcasting programs, which are transmitted in the digital broadcasting transmission system constructed as above.

A digital broadcasting transmission protocol of the present invention includes following information.

1. PSIP of video/audio broadcasting programs, which includes:
    Broadcast channel numbers
    Current time
    Names of broadcasting stations
    Broadcasting start time/end time
    Titles of programs
    Grades of programs
    Stereo/mono classification
    Whether to provide a caption service
    Whether to provide a sound multiplexing service
    Conditional access information (whether to be a charged information, etc.)
    Information on program progression status
    Additional text message
2. PSIP of the data broadcasting programs, which includes:
    The number of data broadcasting programs contained in one broadcasting program
    Start time/end time of respective data broadcasting programs
    Stably receivable time of respective data broadcasting programs
    Grades of respective data broadcasting programs
    Conditional access information (whether to be a charged information, etc.) of respective data broadcasting programs
    Content summary of additional data broadcasting programs Meanwhile, according to the digital broadcasting protocol providing the above information on the video/audio/data, broadcasting programs, the digital television analyzes received digital broadcasting transmission protocol and allows the EPGs of the video/audio/data broadcasting programs to be displayed on the screen.

Figure 3:
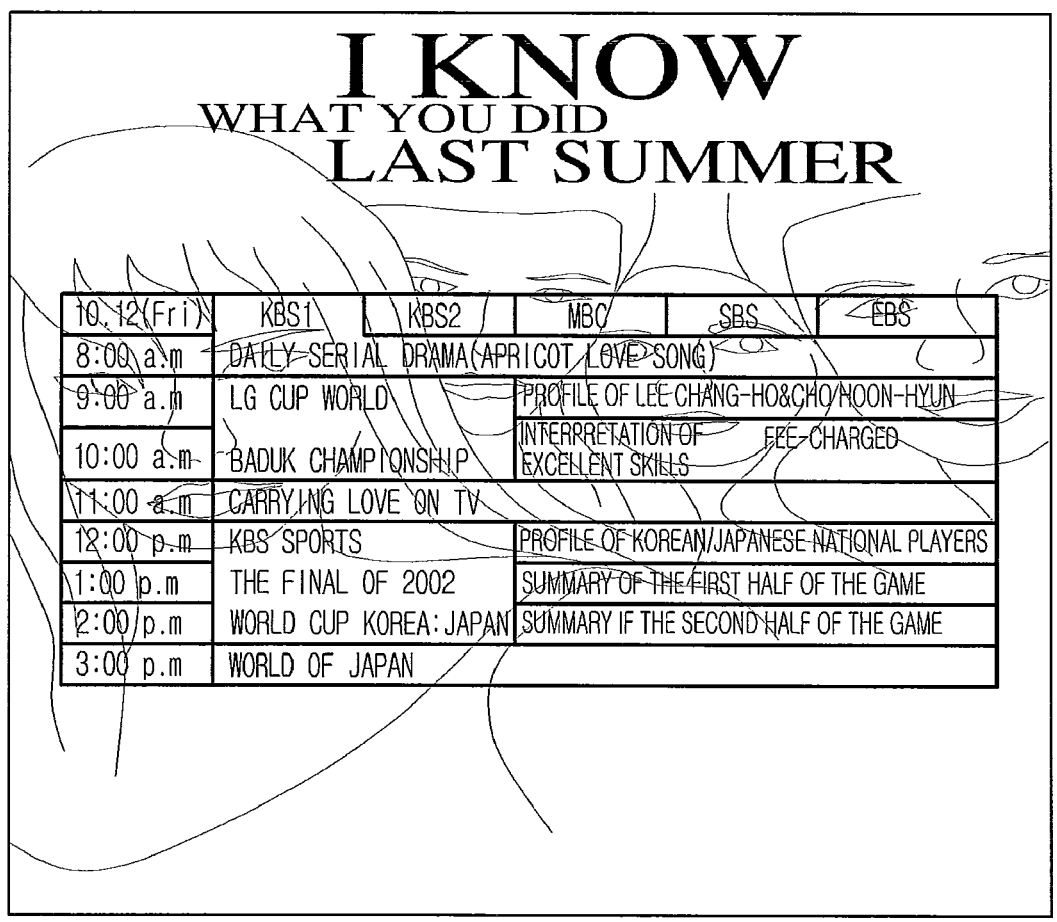
FIGS. 3 to 5 are exemplary screens on which EPGs of a data broadcasting are displayed in a digital television according to the digital broadcasting transmission system of the present invention.
Figure 4:
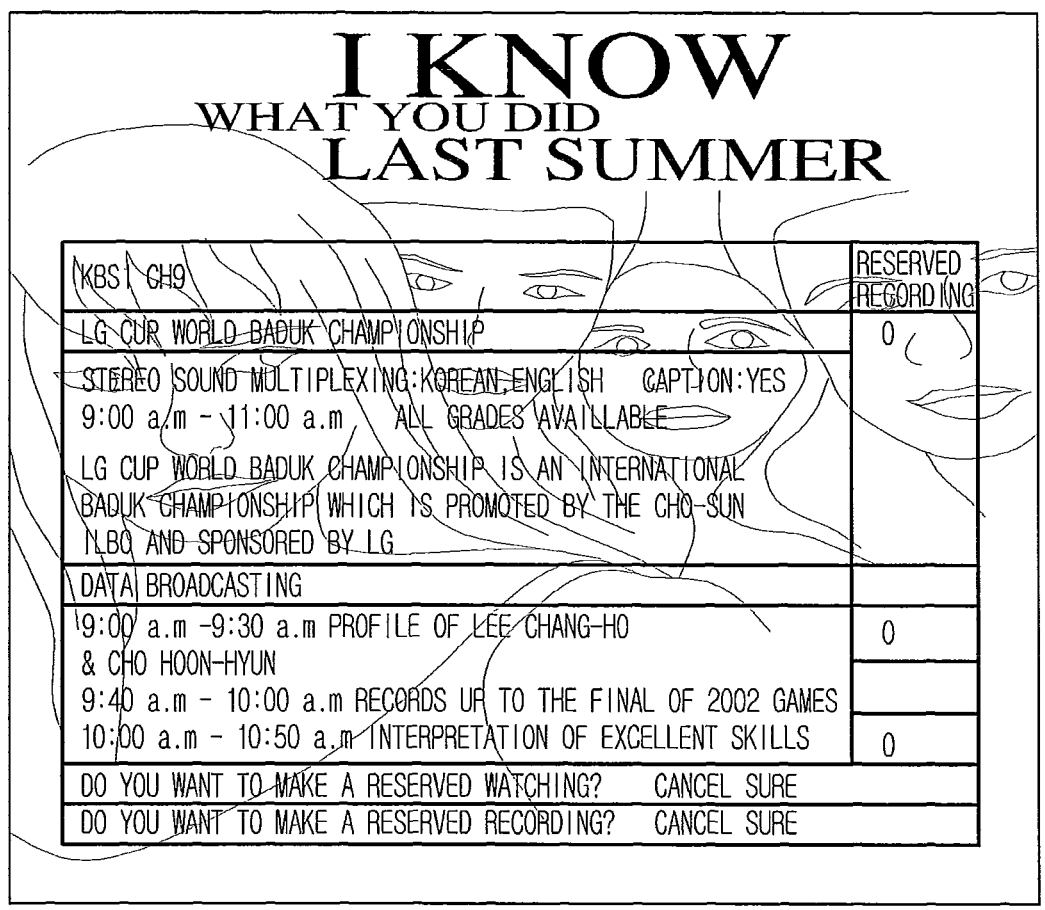
Figure 5:

FIGS. 3 to 5 are exemplary screens on which the EPGs of the data broadcasting are displayed in the digital television, according to the digital broadcasting transmission system of the present invention.

In FIG. 3, there are shown information on the general broadcasting programs including names of broadcasting stations, broadcasting start time/end time and titles of programs, titles of data broadcasting programs, and conditional access information. At this time, for example, if detailed broadcasting information on LG CUP World Baduk Championship is wanted, it can be obtained by selecting corresponding portion (displayed in a yellow color) of the EPG, as shown in FIG. 4.

Referring to FIG. 4, viewers can obtain the detailed broadcasting program information on the LG CUP World Baduk championship via the EPG displayed on the screen.

First, general information on the broadcasting programs can be obtained, which includes broadcast channel numbers, names of broadcast stations, broadcasting start time/end time, titles of programs, grades of programs, stereo/mono information, information on whether to provide a caption service, sound multiplexing service, etc.

Second, it can be seen that a total of three data broadcasting programs is contained in the broadcasting programs of LG CUP World Baduk Championship. In other words, profiles of LEE Chang ho and Cho Hoon-hyun are broadcast at 9:10 a.m.-9:30 a.m., a record up to the final of the 2002 competition at 9:40 a.m.-10:00 a.m., and an interpretation of excellent skills at 10:10 a.m.-10:50 a.m.

Third, the detailed broadcasting program information is displayed on the screen so that the viewers can determine a reserved watching and a reserved recording using the information.

Meanwhile, FIG. 5 shows another example in which the detailed broadcasting program information is displayed in a simple manner.

According to the digital broadcasting transmission system of the present invention, the viewers can obtain the detailed information on the data broadcasting programs as well as the general video/audio broadcasting programs via the EPG displayed on the digital television.

Accordingly, before the broadcasting starts, the viewers can know thoroughly the detailed information on the data broadcasting programs which they want to watch, and they can also use additional functions which help to make good use of the data broadcasting programs. In other words, the viewers can use various functions (reserved watching, reserved recording, selectively reserved recording, etc.) via the EPG.

Here, the selectively reserved recording denotes an individual recording of the general video/audio broadcasting programs, an individual recording of the data broadcasting programs, a simultaneous recording of the general video/audio broadcasting programs and the data broadcasting programs, and a recording of desired data broadcasting programs alone.

As describe above, according to the digital broadcasting transmission system of the present invention, there is an advantage that information on the data broadcasting programs as well as the video/audio broadcasting programs can be provided to the user via the EPG.

Further, according to the digital broadcasting transmission protocol of the present invention, there is an advantage that the PSIP including the detailed information on the video/audio/data broadcasting programs can be provided.

Furthermore, according to the digital television of the present invention, there is an advantage that the detailed information on the video/audio/data broadcasting programs can be provided to the user via the EPG, and various convenient functions can be provided to the user via the EPG displayed on the screen.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of displaying digital broadcasting using a digital device, the method comprising:
   storing, in the digital device, a plurality of television program listings, each of the television program listings including a title, telecast time information and channel information;
   displaying the plurality of television program listings on a screen of the digital device;
   if a program from the displayed television program listings is selected, displaying detailed information of the selected program on the screen,
   wherein the selected program has a plurality of data broadcasting programs related to the selected program, and
   wherein the detailed information includes information of the selected program and information of at least one of the data broadcasting programs related to the selected program;
   displaying, on the screen, a program guide including the television program listings; and
   providing, on the screen, a menu option for allowing a user to perform a reserved viewing or a reserved recording,
   wherein the menu option allows the user to perform the reserved viewing or the reserved recording of at least one of the selected program and each of the data broadcasting programs related to the selected program.

2. The method of claim 1, wherein the menu option allows the user to perform the reserved viewing or the reserved recording of the selected program and each of the data broadcasting programs related to the selected program.

3. A method of displaying digital broadcasting using a digital device, the method comprising:
   storing, in the digital device, a plurality of television program listings, each of the television program listings including a title, telecast time information and channel information;
   displaying the plurality of television program listings on a screen of the digital device;
   if a program from the displayed television program listings is selected, displaying detailed information of the selected program on the screen,
   wherein the selected program has a plurality of data broadcasting programs related to the selected program, and
   wherein the detailed information includes information of the selected program and information of at least one of the data broadcasting programs related to the selected program;
   displaying, on the screen, a program guide including the television program listings; and
   providing, on the screen, a menu option for allowing a user to perform a reserved viewing or a reserved recording,
   wherein the menu option further allows the user to perform the reserved viewing or the reserved recording of at least one of each data broadcasting program related to each program of the displayed television program listings.

4. The method of claim 3, wherein the menu option allows the user to perform the reserved viewing or the reserved recording of each of the data broadcasting programs related to the selected program.

5. A digital device for displaying digital broadcasting, the digital device comprising:
   a storage unit configured to store a plurality of television program listings, each of the television program listings including a title, telecast time information and channel information;
   a display unit including a screen; and
   a controller, cooperating with the storage unit and the display unit, configured to:
      display the plurality of television program listings on the screen of the display unit, and
      if a program from the displayed television program listings is selected, display detailed information of the selected program on the screen,
   wherein the selected program has a plurality of data broadcasting programs related to the selected program,
   wherein the detailed information includes information of the selected program and information of at least one of the data broadcasting programs related to the selected program, wherein the controller is further configured to
control the display unit to display, on the screen, a program guide including the television program listings, and
control the display unit to provide, on the screen, a menu option for allowing a user to perform a reserved viewing or a reserved recording, and
wherein the menu option allows the user to perform the reserved viewing or the reserved recording of at least one of the selected program and each of the data broadcasting programs related to the selected program.

6. The digital device of claim 5, wherein the menu option allows the user to perform the reserved viewing or the reserved recording of the selected program and each of the data broadcasting programs related to the selected program.

7. A digital device for displaying digital broadcasting, the digital device comprising:
a storage unit configured to store a plurality of television program listings, each of the television program listings including a title, telecast time information and channel information;
a display unit including a screen; and
a controller, cooperating with the storage unit and the display unit, configured to:
display the plurality of television program listings on the screen of the display unit, and
if a program from the displayed television program listings is selected, display detailed information of the selected program on the screen,
wherein the selected program has a plurality of data broadcasting programs related to the selected program,
wherein the detailed information includes information of the selected program and information of at least one of the data broadcasting programs related to the selected program,
wherein the controller is further configured to
control the display unit to display, on the screen, a program guide including the television program listings, and
control the display unit to provide, on the screen, a menu option for allowing a user to perform a reserved viewing or a reserved recording, and
wherein the menu option further allows the user to perform the reserved viewing or the reserved recording of at least one of each data broadcasting program related to each program of the displayed television program listings.

8. The digital device of claim 7, wherein the menu option allows the user to perform the reserved viewing or the reserved recording of each of the data broadcasting programs related to the selected program.

* * * * *